United States Patent [19]

Lee et al.

[11] Patent Number: 5,307,336

[45] Date of Patent: Apr. 26, 1994

[54] MULTI-DISK OPTICAL STORAGE SYSTEM

[75] Inventors: Neville K. Lee, Sherbourn; Amit Jain, Marlboro, both of Mass.; Erwin Keppeler, Marktoberdorf, Fed. Rep. of Germany; Mark Bouchard, South Burlington, Vt.

[73] Assignee: Digital Equipment Corporation, Maynard, Mass.

[21] Appl. No.: 847,116

[22] Filed: Mar. 6, 1992

[51] Int. Cl.$^5$ ............................................. G11R 7/085
[52] U.S. Cl. ..................................... 369/112; 369/36; 369/199; 369/178
[58] Field of Search ...................... 369/44.14, 112, 180, 369/111, 178, 179, 198, 199, 36, 34, 35, 37, 38

[56] References Cited

U.S. PATENT DOCUMENTS

| | | | |
|---|---|---|---|
| 4,387,452 | 6/1983 | Bricot et al. | 369/199 |
| 4,532,402 | 7/1985 | Overbeck | 219/121 |
| 4,566,087 | 1/1986 | Kraft | 369/37 |
| 4,712,887 | 12/1987 | Baer . | |
| 4,785,438 | 11/1988 | Mizunoe | 369/13 |
| 4,807,204 | 2/1989 | Mizutani et al. | 369/13 |
| 4,888,751 | 12/1989 | Yoshimaru et al. | 369/36 |
| 4,926,403 | 5/1990 | Tsuyaguchi et al. | 369/13 |
| 5,189,652 | 2/1993 | Inoue | 369/44.14 |
| 5,202,880 | 4/1993 | Lee et al. | 369/275.4 |

FOREIGN PATENT DOCUMENTS

| | | | |
|---|---|---|---|
| 59-210570 | 11/1984 | Japan | 369/199 |
| 62-281126 | 12/1987 | Japan | 369/178 |
| 4-061080 | 2/1992 | Japan | 369/178 |

*Primary Examiner*—Paul M. Dzierzynski
*Assistant Examiner*—Drew A. Dunn
*Attorney, Agent, or Firm*—Cesari and McKenna

[57] ABSTRACT

An optical storage system comprises a disk assembly, an optical assembly and a carriage assembly arranged to provide a high-performance, multiple-disk storage device. The disk assembly includes a plurality of disks axially spaced on a rotatably mounted spindle and configured to record data on pairs of opposing facing recording surfaces. The optical assembly includes a static optics package for generating a collimated optical beam used to store and retrieve data from the disks, and a beam distribution system for directing the optical beam to a selected recording disk surface. The carriage assembly includes a plurality of carriage arms supporting head assemblies that are arranged for insertion between the pairs of opposing recording disk surfaces. The head assemblies are further arranged in facing relation to the recording disk surfaces to receive the optical beam from the beam distribution system and direct the beam onto the disk surface.

12 Claims, 5 Drawing Sheets

5,307,336

MULTI-DISK OPTICAL STORAGE SYSTEM

FIELD OF THE INVENTION

This invention relates generally to optical storage systems and, more specifically, to an optical beam distribution system for an optical storage device.

BACKGROUND OF THE INVENTION

Conventional optical storage drives typically employ a single optical disk having a single recording surface for storing information. Use of a single disk allows the optical components, such as an optical beam source, mirrors, lenses and the head assembly, to be arranged relative to the recording surface in a manner that optimizes the size and cost of the drive. Although this results in a low-cost device having a relatively small form factor for, e.g., a 5¼-inch disk, the storage capacity of the drive is limited to that provided by a single surface.

To provide increased storage capacity, a storage device can include an array of disks having multiple recording surfaces for storing information. The optical components of the multi-disk device are arranged to direct an optical beam onto each recording disk surface. Specifically, the components must be precisely aligned within the space constraints provided by a conventional single-disk drive; compatibility with such a form factor requires that the disks of the array be closely-spaced. Further, the optical components must be manufacturable within the cost constraints of the conventional single-disk drive optical components.

Known multiple-disk, optical storage drives generally are not compatible with the small form factor standard One example of such a drive involves a single head assembly mounted on an elevator carriage. The head assembly is relatively large and heavy because it includes a complete optics system that physically moves within the drive to bring the optical beam to each recording disk surface. The massive head assembly causes ringing during positioning of the head between disk surfaces. This, in turn, causes an increase in the access time of the drive because time is spent waiting for the ringing to cease. In addition, the performance of the system is degraded, particularly when the requested data is dispersed among multiple disk surfaces.

Another example of a multiple-disk storage drive involves a multiple head assembly system. Here, each recording surface has its own complete optics system, including optical beam source and detectors, mirrors and lenses, mounted to an associated head assembly. This type of system is costly because of the duplication of optical components. Although the system provides simultaneous accesses to the recording surfaces, duplication of the optical components results in a large size and mass.

Therefore, it is desirable to provide a high-performance, multiple-disk optical storage device that meets the size and cost constraints of conventional disk drives.

It is also desirable to provide a high-performance, multiple-disk storage device having an optical beam distribution system.

It is also desirable to provide an optical beam distribution system that enables use of a small objective lens for reducing the size and weight of an air bearing slider of an optical head assembly.

SUMMARY OF THE INVENTION

Briefly, a storage system in accordance with the invention comprises a disk assembly, an optical assembly and a carriage assembly arranged to provide a high-performance, multiple-disk array, magnetic-optical storage device. The disk assembly includes a plurality of disks axially spaced on a rotatably mounted spindle and configured to record data on pairs of opposing facing recording surfaces The optical assembly includes a static optics package for generating a collimated optical beam used to store and retrieve data from the disks, and a "beam distribution" system for directing the optical beam to a selected recording disk surface. The carriage assembly includes a plurality of carriage arms supporting head assemblies that are arranged for insertion between the pairs of opposing recording disk surfaces. The head assemblies are further arranged in facing relation to the recording disk surfaces to receive the optical beam from the beam distribution system and direct the beam onto the disk surface.

In another aspect of the invention, the optical "beam distribution" system includes a single, galvanometer-controlled mirror (galvo mirror) for distributing the beam to a selected recording disk surface of the array. The galvo mirror, which is shared among the recording disk surfaces, distributes the beam to optical components having mirrors positioned at non-complex angles to ensure that the beam travels orthogonally to the surfaces of the disks. Specifically, the beam distribution system includes a deflection mirror tower (DMT) having a plurality of mirrors configured to deflect the beam horizontally and parallel to the surfaces of the disks, and a lens/mirror tower (LMT) having a plurality of imaging lens/mirror sets. Each lens/mirror set, in turn, directs the horizontally-deflected beam to a fold prism situated between pairs of optical head assemblies adjacent to the disk surfaces.

The beam distribution system also includes a plurality of relatively small objective lenses. Each lens is mounted to an air bearing slider of a head assembly associated with a recording disk surface. The air bearing sliders of the optical head assemblies are flexibly mounted to arms of a carriage assembly including a coarse actuator that moves radially back and forth across the disks in coarse tracking operations so that the sliders are at a prescribed flying height while scanning the tracks of the optical disk surfaces. In the preferred embodiment of the invention, pairs of head assemblies are mounted to respective carriage arms, with each head assembly arranged in facing relation to a recording disk surface. A fold prism is mounted to each arm and positioned, as noted, between the pair of head assemblies.

Operationally, a relay mirror mounted to the DMT guides the optical beam from the optics package onto the galvo mirror, which then reflects the beam to one of the mirrors on the DMT. Each mirror is arranged at an angular orientation to deflect the laser beam through an imaging lens of the LMT and to a corresponding 45° mirror located at the back of the LMT. The lens/mirror set thus redirects the beam to a fold prism of a corresponding head assembly, which redirects the beam vertically to an objective lens and onto a selected track.

The galvo mirror also performs remote fine tracking and positioning operations, and, as noted, coarse tracking is accomplished with the coarse actuator. While relatively slow carriage movement is required for access to cylinders of the disk array beyond the fine track range, the latter range includes a very substantial storage capacity so that, given a suitable storage strategy, relatively few coarse track accesses will be required and the overall access time will therefore be relatively short.

Moreover, the carriage assembly is preferably connected in a servo loop that moves the carriage toward the position in which the fine track unit is positioned in the center of its range of beam movement. Thus, as the fine track unit moves the beam from cylinder to cylinder toward a limit of its range, the carriage moves in response, moving the fine track unit back toward the middle of its range and thereby extending the overall range of the fast fine track operation.

An advantage of the novel beam distribution system is that no moving parts other than the galvo mirror are required to direct the optical beam onto an objective lens. In addition, the mirror deflection arrangement substantially reduces the access time, as compared with previously known optical drives, so as to provide a high-performance storage system.

Also, a recollimation lens provides focusing correction for the objective lenses and alignment correction for the track-following servo. For these functions, the recollimation lens is mounted to an actuator for both axial and transverse position adjustment.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
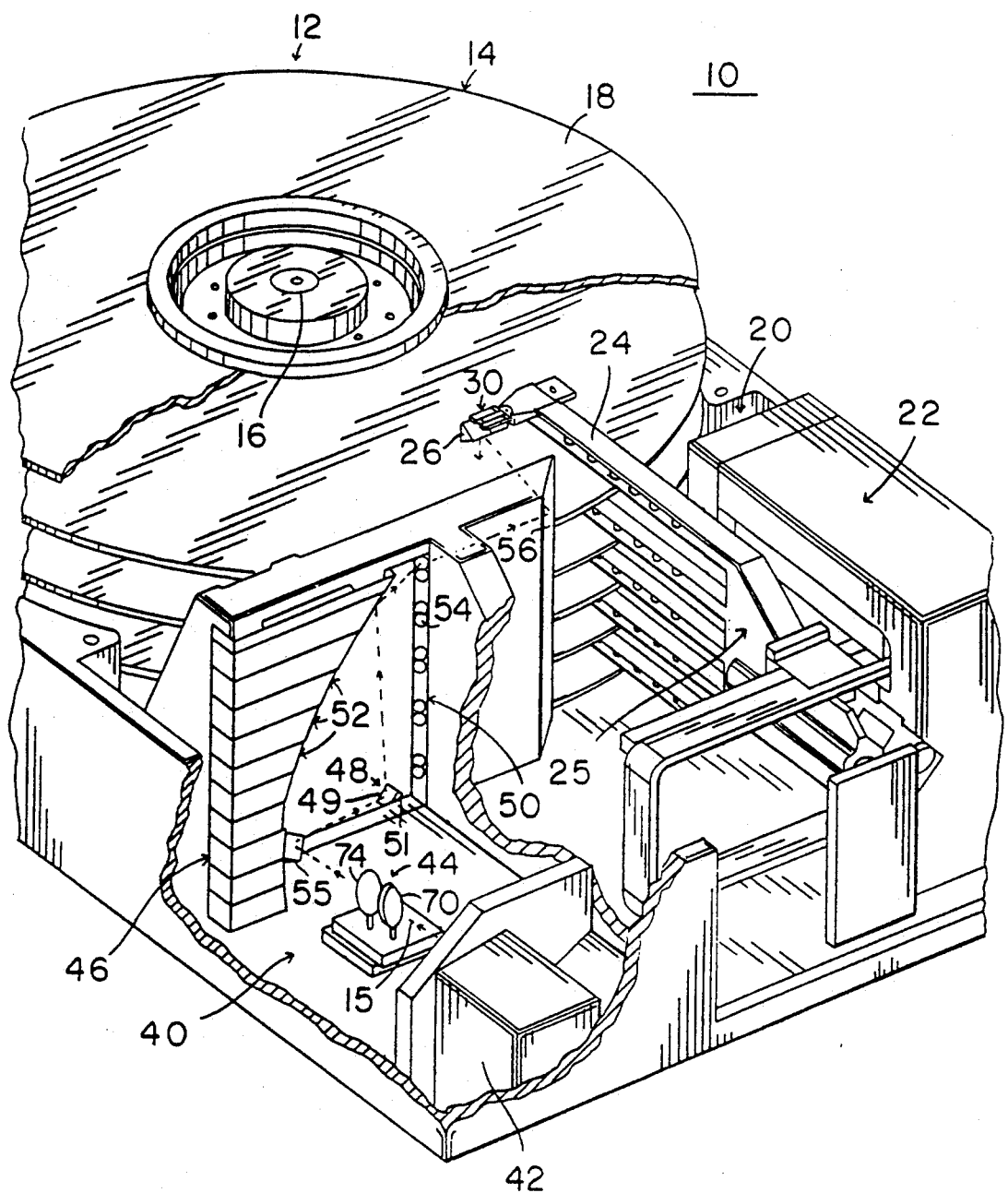
FIG. 1 is a perspective view, partially broken away, of a multiple-disk, magneto-optical storage device having disk, carriage and optical assemblies configured to utilize the apparatus and method of the present invention.

FIG. 1 depicts a multiple-disk, magneto-optical storage device 10 including an optical assembly 40, a carriage assembly 20 and a disk assembly 12, the latter comprising a plurality of double-sided disks 14 axially spaced on a rotatably mounted spindle 16. The top surface 18 of the top disk and the bottom surface of the bottom disk (not shown) are generally not used for data storage; therefore, information is recorded on the remaining disk surfaces comprising pairs of opposing facing recording surfaces.

In the system specifically described herein, each of the data-recording surfaces of the disks 14 is formed with concentric grooves 190 (FIG. 4) defining tracks in the form of flat lands 192 on which the data is recorded. Alternatively, a single, spiral groove may be formed to define a spiral track. In either case, the optical, i.e., laser, beam 15 overlaps the edges of each land slightly. Accordingly, the reflected beam includes lobes resulting from diffraction at the edges of the lands. The relative intensities of the lobes on opposite sides of the land depend on the transverse position of the beam with respect to the land. In a known manner, a servo senser uses these relative intensities to ascertain the transverse beam position. The track-following servo loop described herein uses this information to center the laser beam on the centerlines of the tracks.

The carriage assembly 20 generally comprises a linear coarse actuator 22 and a carriage 25 having a plurality of carriage arms 24 vertically spaced and arranged for insertion between the pairs of surfaces of the disks 14. Alternately, a rotary coarse actuator may be used within the teachings of the invention. Mounted to each carriage arm 24 are a fold prism 26 positioned between a pair of head assemblies 30 facing the recording disk surfaces.

Figure 2:
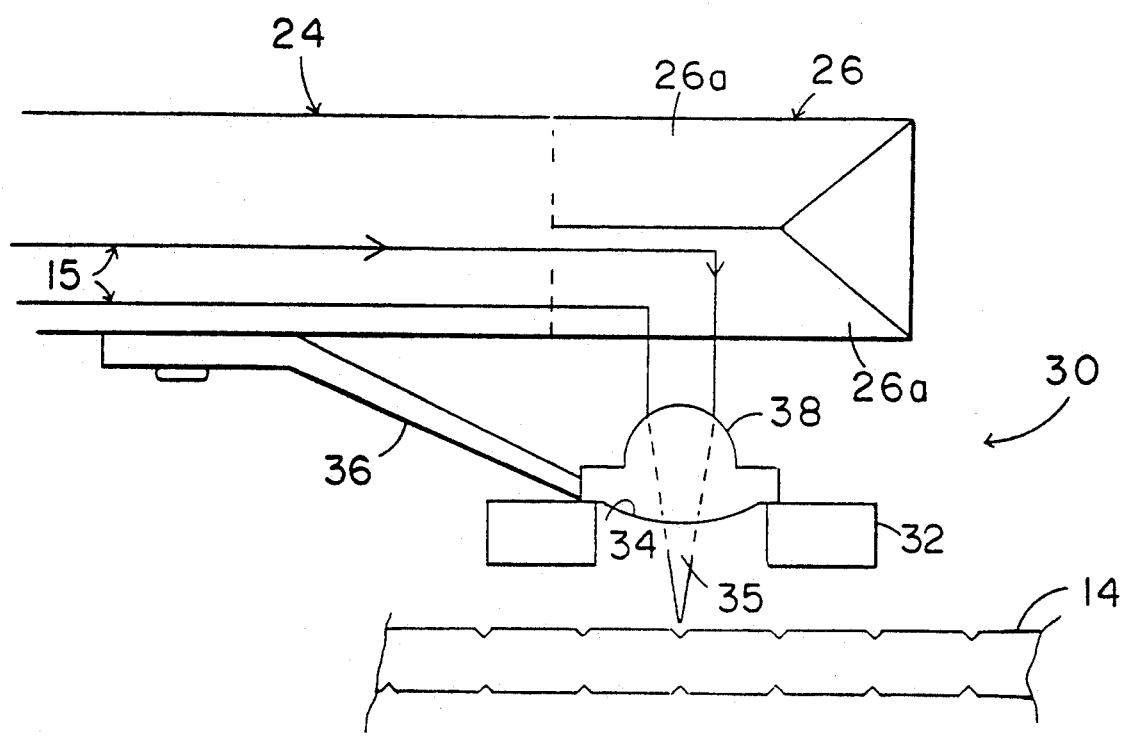
FIG. 2 is a schematic sectional diagram of an optical head assembly of the storage device of FIG. 1.

FIG. 2 is a simplified diagram of an optical head assembly 30. Each head assembly 30 typically includes an air bearing slider 32 flexibly connected to a carriage arm 24 by a resilient flexure 36. The aerodynamic force generated from the interaction between the slider 32 and a spinning disk 14 urging the slider toward the disk surface is counteracted by an opposing spring force from the flexure 36. This allows the air bearing slider 32 to maintain the head assembly 30 at a prescribed flying height (approximately 20–80 microinches) from the disk surface.

An objective lens 38 is mounted in a cavity 34 of each slider 32 such that the nominal optical axis of the lens 38 passes through a focal point 138 thereof and also substantially through the center of a slit (not shown) terminating the cavity 34 above the disk surface. The fold prism 26 is rigidly attached to an end of the carriage arm 24; the prism has a triangular cross-section and is reflectively coated on both its surfaces 26a. The resulting two-faced mirror 26 directs a laser beam 15 onto the objective lens 38 of the head assembly 30, which then converges the beam to a spot on the surface of the disk 14. In operation, the objective lens 38 is moved radially or arcuately across the disk with the head assembly 30 in accordance with the movement of the coarse actuator 22 (FIG. 1).

Referring again to FIG. 1, the optical assembly 40 generally comprises a static optics package 42, a collimation-correction lens assembly 44, a deflection mirror tower (DMT) assembly 46, a fine positioning and disk selection actuator 48, a lens/mirror tower (LMT) assembly 50 and the above-mentioned plurality of objective lenses 38. The housing of the optical device 10 includes a plurality of datum, i.e., reference, surfaces that are used to position the optical components within the optical assembly 40. Specifically, the datum surfaces are used to accurately and inexpensively align the optical components.

The static optics package 42 may include a stationary laser source and collimator (not shown) for generating a collimated laser beam 15 used to store and retrieve information from the optical disks 14. Also included in the optics package is a prism assembly (not shown) that includes polarizing beam splitters. The beam splitters guide the laser beam reflected from the disk surfaces to a detection system comprising data and servo detectors. The details of this arrangement are well known and, therefore, are not described herein.

Figure 3:
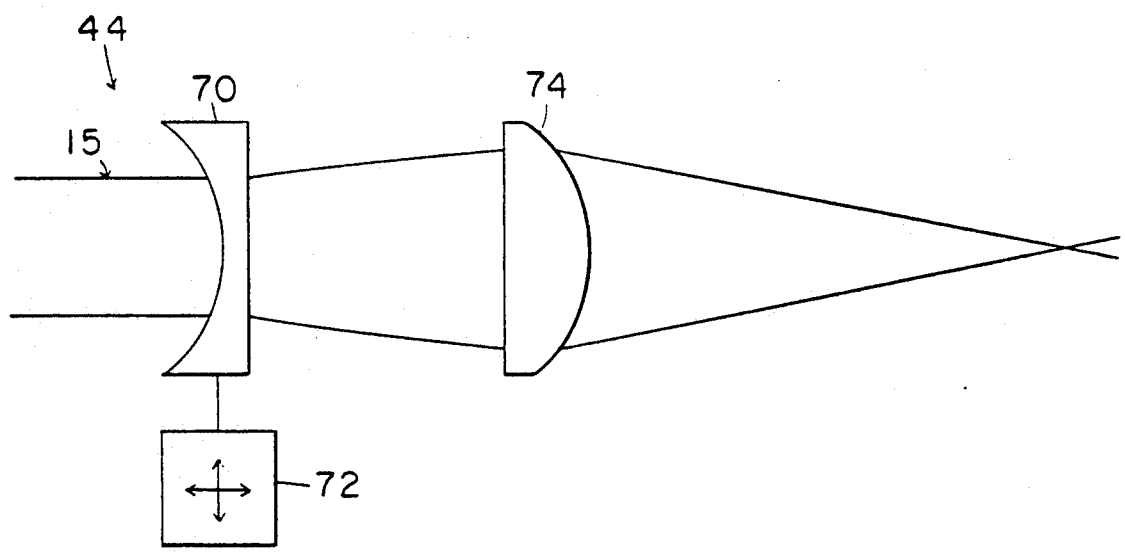
FIG. 3 is a diagram of a preferred embodiment of a collimation-correction lens assembly.

The collimation-correction lens assembly 44 may comprise a single convex lens; however, in the preferred embodiment of the invention, as shown in FIG. 3, the collimation-correction lens assembly 44 comprises two lenses: a negative planoconcave lens 70 mounted to a 2-dimensional actuator 72 and a fixed, positive planoconvex lens 74. The lens assembly 44 functions to provide a desired collimated laser beam by converging the incident beam at the imaging lens 54; the imaging lens 54 then collimates the beam that it passes on to the objective lens 38. The 2-dimensional actuator 72 comprises a transverse actuator for correction of alignment errors among the optical components of the assembly 40 and an axial actuator for remote focusing operations. These functions will be described in further detail below.

Figure 4:
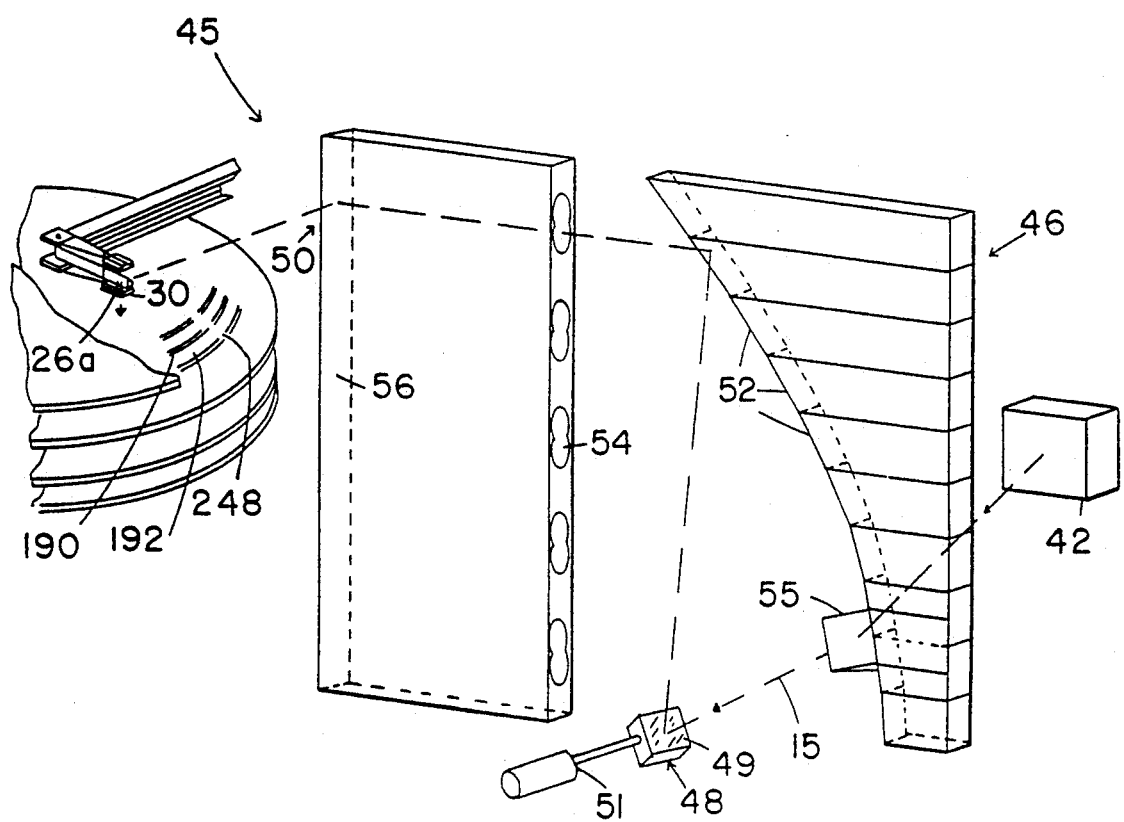
FIG. 4 is a diagram of an optical beam distribution system of the optical assembly of FIG. 1.

FIG. 4 depicts various optical components of the assembly 40, which are arranged to provide an optical beam distribution system 45 for the storage device 10. Specifically, the fine positioning and disk selection actuator 48 preferably comprises a mirror 49 mounted for rotation by a galvanometer (galvo) 51. The mirror 49 functions as a beam steering element that is rotated about a steering axis to direct the laser beam 15 from the optics package 42 to a selected disk surface and onto a selected track on that surface.

The DMT assembly 46 comprises a plurality of individual mirrors 52 arranged along a vertical axis thereof, the axis being parallel to the rotating axis of the disks 14 (FIG. 1). Each mirror 52 is uniquely configured to deflect the laser beam 15 horizontally, i.e., in the plane of the disks 14. An example of a DMT is disclosed in copending and commonly-assigned U.S. patent application titled, APPARATUS AND METHOD FOR FABRICATING A DEFLECTION MIRROR TOWER, by Lee et al. filed herewith and expressly incorporated by reference as though fully set forth herein.

The LMT assembly 50 comprises an array of lens and mirror elements integrally formed on a monolithic substrate. Specifically, each lens 54 is formed on the front surface of the substrate and functions as an imaging lens to transfer the reflection of the laser beam 15 at the galvo mirror 49 to an associated objective lens 38 (FIG. 2). In a preferred embodiment of the invention, the mirror elements are arranged at a 45° angle relative to the front surface; the mirror elements are also preferably configured as one reflective back surface 56 of the substrate. An example of an LMT is disclosed in copending and commonly-assigned U.S. patent application titled, APPARATUS AND METHOD FOR FABRICATING A LENS/MIRROR TOWER, by Lee et al. filed herewith and expressly incorporated by reference as though fully set forth herein.

Within the space limitations of the magneto-optical storage device 10, there is a tradeoff between the number of disks 14 that the device 10 may accomodate and the size of the DMT 46 and LMT 50 components. In general, larger mirror and lens elements provide greater tracking flexibility. However, it is an object of the invention to provide a multiple-disk optical storage device that generally conforms to the size constraint of conventional disk drives. Accordingly, in the preferred embodiment of the invention, the optical beam distribution system 45 accomodates six optical disks and ten disk surfaces for data storage, since, as noted, the outer surfaces of the outer disks are not used.

The galvo mirror 49 selects among the disk surfaces by directing the laser beam 15 to the appropriate mirror 52 on the DMT 46. Operationally, a relay mirror 55, preferably located on the DMT 46, guides the laser beam onto the galvo mirror 49, which then reflects the beam to one of the mirrors 52. The deflection mirrors 52 are arranged at various angular orientations to deflect the laser beam toward an imaging lens/mirror set 54,56 contained in the LMT 50. The positions of the mirrors 52 are such that the paths from the galvo mirror 49 to the imaging lenses 54 are of substantially equal length. As noted, the mirror elements 56 are preferably configured as a single 45° mirror located at the back of the LMT 50, which directs the beam from any of the lenses 54 to a corresponding fold prism surface 26a and thus onto a selected head assembly 30.

The galvo mirror 49 also performs remote fine tracking and positioning operations. Fine tracking or "track-following" involves movement of the laser beam to continuously align the beam with a given track by slightly adjusting the position of the beam on the appropriate mirror 52. Fine positioning, on the other hand, involves small-distance movement of the laser beam across a range of tracks on a disk surface. Coarse tracking operations, i.e., tracking over large distances, is accomplished by moving the head assembly in the cross-track direction using the carriage assembly 20 (FIG. 1).

With the exception of the galvo mirror 49, all of the mirrors of the beam distribution system 45 are configured at non-complex angles. This arrangement ensures that the movement of the laser beam during fine tracking and fine positioning operations will be precisely orthogonal to the tracks on the disk surface. If the movement of laser beam from a first track to a second track was not precisely in the cross-track direction on the disk surface, the domains of the second track would be slightly out of synchronization with the domains of the first track. Thus, timing errors could occur as the beam switches from one track to an adjacent track.

As noted, the collimation-correction lens assembly 44 preferably comprises a negative planoconcave lens 70 mounted to a 2-dimensional actuator 72 and a fixed, positive planoconvex lens 74. Referring to FIGS. 1-4, the lens assembly 44 may be adjusted to provide centering of the collimated laser beam 15 on the objective lens 38 when the lens is centered on the disk track on which a read or write operation is pending. After fabrication of the head assemblies 30 and subsequent mounting to the carriage arms 24, the objective lenses 38 and the other optical elements may not be precisely aligned. Typically, the head assemblies may be vertically displaced 25-100 microns with respect to each other. Also, during assembly of the DMT 46, there may be slight errors in the orientations of the mirrors 52. These factors may contribute to a core DC-offset error in the track-following servo loop. Transverse adjustment of the collimation-correction lens assembly 44, specifically, the negative lens 70, corrects for these alignment errors and also alignment errors that may subsequently be encountered because of temperature changes.

Further, transverse adjustment of the negative lens 70 may be performed dynamically to create a self-alignment capability in the storage device 10. As the galvo mirror 49 changes its angular position and the coarse actuator 22 moves across a disk surface, the collimated laser beam may deviate slightly from the optical axis of an objective lens 38, causing a DC-offset error. A servo control loop (not shown) including the galvanometer 48, the coarse actuator 22 and the alignment component of the 2-dimensional actuator 72 may provide a dynamic DC-offset correction capability.

Similarly, remote focusing may be provided by axial displacement of the collimation-correction lens assembly 44 using the focusing component of the actuator 72. Static focusing involves initial axial adjustments of the negative lens 70 to compensate for different heights of the objective lenses 38 with respect to the disk surfaces and for manufacturing tolerances in other parts of the optical system. In addition, refocusing may be needed to compensate for the effects of temperature changes. The focusing operation involves the use of a four-quadrant data detector (not shown) in a well-known manner. The axial positions of the lens 44 corresponding to the respective lenses 38 may be stored in random access memory (not shown) and then retrieved as the optical beam is shifted from one disk surface to another.

Figure 5:
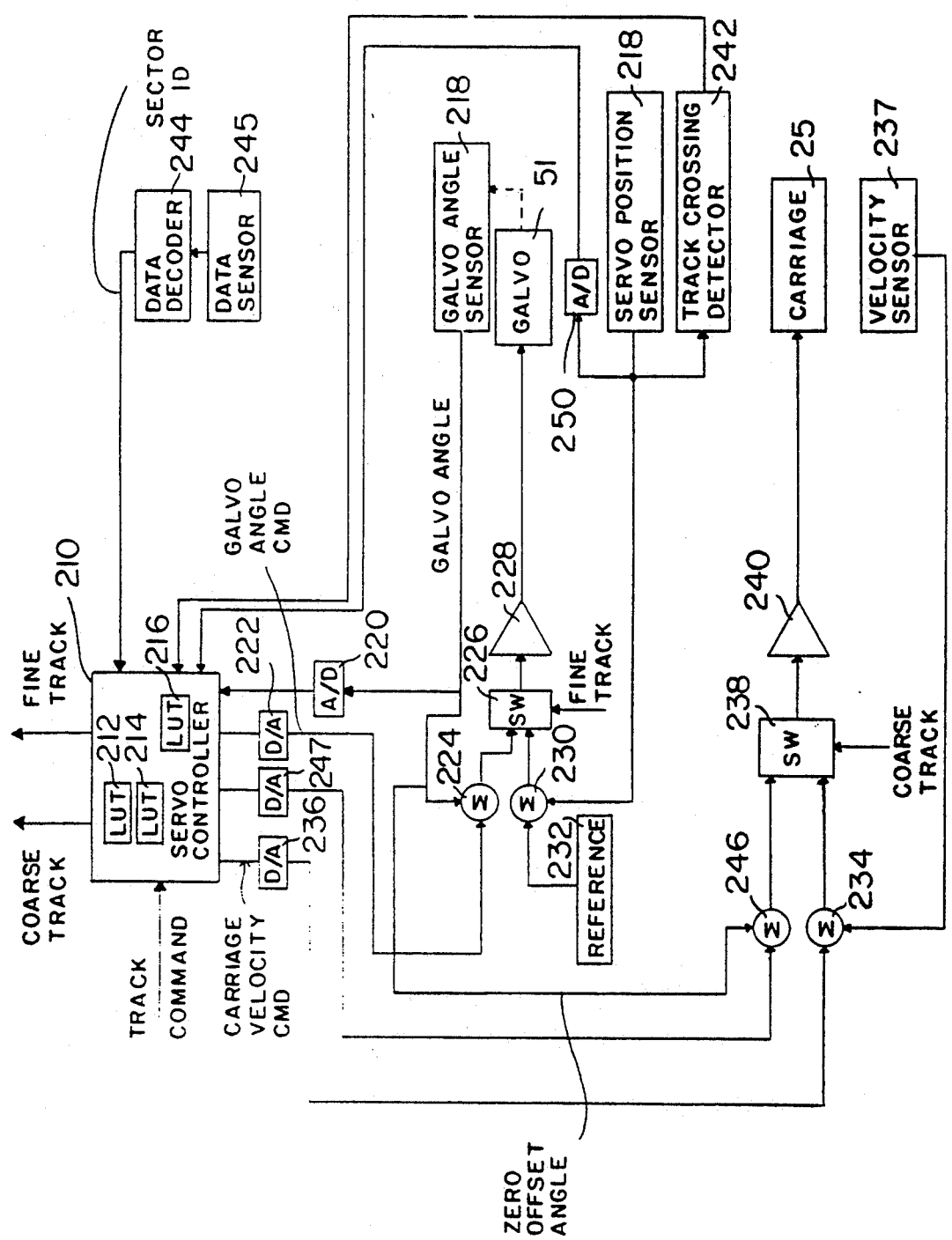
FIG. 5 is a schematic diagram of a track seeking and following servo system in accordance with the invention.

The track seeking ,and following system is depicted schematically in FIG. 5. The seeking operations are governed by a controller 210 which causes the laser beam 15 to be moved in response to track commands identifying data tracks on which reading and writing operations are to be performed. Since track accessing is accomplished in a closed loop manner, the controller 210 also responds to various position-indicating signals as described below.

For movement within the fine track range of the system, the controller 210 commands the galvanometer 51 to move the mirror 49 to an angular position corresponding to the desired track. Specifically, the controller includes a look-up table (LUT) 212 which contains, for each of the disk surfaces, the angular position of the mirror 49 when it is in the middle of its fine track range, i.e., when the laser beam 15 passes through the optical axis of the objective lens 38. This position of the mirror 49 is termed the "zero offset angle" and the corresponding track is termed the "zero offset track". A second lookup table 214 provides for each offset track within the fine track range and the corresponding offset angle of the mirror 49, i.e., the difference between the angular position of the mirror and the zero offset track. The controller further includes a third look-up table 216 which is an inversion of the look-up table 214. That is, it is entered by means of the offset angle to determine the corresponding track offset.

Assume first that the controller 210 receives a command to move the laser beam 15 to a track within the fine track range of the system and on the disk surface to which the beam is already directed. The controller first determines the present track offset. Specifically, it obtains the mirror 49 angle from an angle sensor 218 whose output is applied to an analog-to-digital converter 220 to provide a digital representation of the angle. This angle is subtracted from the zero offset angle for the disk surface, as obtained from the lookup table 212, to provide the direction and magnitude of the offset angle. The magnitude of the offset angle is applied to the lookup table 216 to provide the absolute value of the present track offset.

The present track offset is then algebraically added to the present track number to provide the track number of the zero offset track. This is subtracted from the desired track number to obtain the new track offset. The latter value is checked to ascertain whether or not it is within the fine track range. If it is, the value is used to address the lookup table 214 to obtain the new offset angle of the galvanometer. The offset angle is added to the zero offset angle to provide the angle to which the mirror 49 is to be moved to move the beam to the desired track.

The new offset angle is applied to a digital-to-analog converter 222 whose output in turn is applied to a summing circuit 224 whose other input is the analog signal from the angle sensor 218. The output of the summing circuit 224 is passed through a switch 226 which is conditioned by a fine track signal from the controller 210 to pass the error signal to an amplifier 228 and included compensation circuitry that drive the galvanometer 51.

The galvanometer 51, angle sensor 218, summing circuit 224 and amplifier 228 thus operate as a servo loop to move the mirror 49 to the angle commanded by the servo controller 210. A preferred embodiment of the angle sensor 218 comprises an optical arrangement (not shown in the drawings) in which a secondary mirror is affixed to the back surface of the mirror 49. The secondary mirror reflects a secondary beam from a laser diode to a lateral effect photodiode whose electrical output indicates the position of the reflected secondary beam and thus the angular position of the mirror 49. The laser diode emits a relatively narrow beam having an elliptical cross section and it is oriented so that, on the photodiode, the minor axis of the beam is parallel to the direction of beam movement and the major axis overlaps the longitudinal edges of the photodiode.

When the galvanometer reaches the desired angle, as indicated by the output of the converter 220, the servo controller deasserts the fine track signal, thereby switching the galvanometer 51 into a track-following servo loop. Specifically, the output of the servo position sensor 218a is applied to a summing circuit 230 which compares the sensor output with a reference value supplied by a reference source 232. The resulting error signal is passed by the switch 226 to the amplifier 228 which drives the galvanometer 51. This moves the laser beam 15 to the center of the selected track and maintains it at that position.

If a seeking operation involves a track on another disk surface, but still within the fine track range of the system, operation is the same as set forth above except that, in calculating the angular position to which the mirror 49 is to be moved, the controller 210 uses the zero offset angle for the new disk surface.

For track-seeking operations beyond the fine track range of the system, the controller 210 moves the carriage 25 in a servo loop similar to those used in prior magnetic disk drive systems. Specifically, the controller issues a velocity command to an analog summing circuit 234 by way of a digital to analog converter 236. The summing circuit 234 sums the velocity command with the output of a carriage velocity sensor 237. The resulting error signal is passed by a switch 238, conditioned by a coarse track signal asserted by the controller 210, to an amplifier 240 that drives the carriage actuator 22.

A track-crossing detector 242 emits track crossing pulses in response to the output of the servo position sensor 218. These pulses are counted by the controller 210 to determine the position of the beam 15 to modify the velocity command and thereby bring the carriage rest at the desired position. A data decoder 244 derives track identification numbers from the output of the data sensor 245 and this information is used by the controller 210 to ensure that the desired track has been reached. The track following servo loop involving the galvanometer 51 then centers the laser beam on the selected track.

When the carriage has reached the position to which it is moved during a coarse track operation, the controller 210 deasserts the coarse track signal and the switch 238 then passes to the amplifier 240 the output of a summing circuit 246. One input to the summing circuit 246 is a signal from the controller 210 and a digital-/analog converter 247, indicating the zero offset position of the mirror 49 for the disk surface on which operations are being performed. The other input is a signal from the galvanometer angle sensor 218. The circuit 246 subtracts these two signals to provide an error signal that drives the carriage toward the track corresponding to the zero offset position of the mirror 49. As the carriage moves toward that position, the track following servo loop containing the galvanometer adjusts the mirror angle correspondingly so that the mirror is moved toward its zero offset angle.

Also, during a coarse track seeking operation, the controller 210 can move the mirror 49 to the limit of its fine track range in the direction of carriage movement, thereby decreasing the distance that the carriage has to move to reach the selected track.

The voltage provided by the reference source 232 can be used to eliminate the effects of offsets in the electrical and optical portions of the system. These offsets can cause the track-following servo loop to position the laser beam 15 off the center lines of the tracks. To derive the reference voltage, the system makes use of a small portion of each track in which the inter-track grooves 190 are interrupted. Specifically, as shown in FIG. 4, the groove interruptions provide a groove-free radial band 248 on each disk surface. During each interval that the band 248 intercepts the laser beam 15, the beam reflected from the disk surface contains no position information.

Accordingly, if there are no offsets in the system the servo position senser 218a will indicate zero position error. If there are offsets, the sensor 218a will indicate a position error that is the algebraic sum of such offsets. This error indication is fed to the controller 210 by way of an analog/digital converter 250 and the controller 210 in turn provides the reference to the source 232 which, in this case, may take the form of a digital-/analog converter.

At startup of the system, the controller may measure the offsets for different offset tracks on each of the disk surfaces and store these offsets in a lookup table (not shown). The stored offsets may then be used initially whenever the laser beam is moved to a new track, with the contents of the lookup table being updated whenever the laser beam is intercepted by the radial band 248.

In summary, the invention provides a high-performance multiple-disk magneto-optical storage device that employs virtually no moving parts, i.e., one static optics package, one galvo mirror and one set of electronics associated with the galvo mirror. This arrangement reduces the access time of the storage device because there is no need to move the optics package and the galvo from disk-to-disk during disk selection or across a disk surface during coarse tracking. This, in turn, minimizes the cost, size and weight of the system such that the storage device may be packaged in a compact housing compatible with the standard small-disk form factor. In addition, the collimation-correction lens assembly provides alignment and focusing correction for the storage device. Further, the arrangement of the mirror components ensures that the deflected laser beam moves orthogonally to the tracks on a disk during fine tracking and fine positioning operations, thereby preventing timing errors.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. An optical storage system comprising:
   (A) a disk assembly including a plurality of disks axially spaced on a rotatably mounted spindle, said disks configured to record data on pairs of opposing facing recording surfaces thereof;
   (B) an optical assembly including a static optics package for generating a collimated optical beam used to store and retrieve said data from said disks, said optical assembly further comprising a beam distribution system for directing said optical beam to a selected recording disk surface, said beam distribution system comprising (i) a beam steering element configured to rotate about a steering axis thereof to direct said optical beam to a selected objective lens at varying angles relative to the optical axis thereof; (ii) a lens/mirror tower having a plurality of mirror elements and lens elements arranged as sets, each being optically disposed on the path of said beam between said steering element and an associated one of said objective lenses to direct said optical beam to said associated objective lens, each of said lens elements further functioning as an imaging lens to provide substantially at said associated objective lens an image of said beam at said steering axis; and (iii) a deflection mirror tower having a plurality of deflection mirrors optically disposed in the paths between said beam steering element and said lens/mirror sets, said plurality of deflection mirrors having various angular orientations to deflect said optical beam to an associated one of said imaging lens; and
   a carriage assembly including a plurality of carriage arms vertically spaced and arranged for insertion between said pair of opposing recording disk surfaces, each of said carriage arms having a pair of head assemblies mounted thereto, each of said head assemblies being arranged in facing relation to said recording disk surfaces and comprising an air bearing slider flexibly connected to a respective carriage arm, said slider including an objective lens having an optical axis passing through a focal point thereof and operating to converge said optical beam received from said beam distribution system to a spot on said disk surface.

2. An optical beam distribution system for directing an optical beam generated by a static optics unit over tracks on a selected one of a plurality of disk surfaces of an optical storage device and onto a selected track of that surface, said beam distribution system comprising:
   a plurality of objective lenses, each having an optical axis passing through a focal point thereof, each of said objective lenses being associated with one of said disk surfaces and operating to converge said optical beam to a spot on said associated disk surface;
   a beam steering element configured to rotate about a steering axis thereof to direct said optical beam received from said optics unit to a selected objective lens at varying angles relative to the optical axis thereof;

a lens/mirror tower having a plurality of mirror elements and lens elements arranged as sets, each being optically disposed in the path of said beam between said steering element and an associated one of said objective lenses to direct said optical beam to said associated objective lens, each of said lens elements further functioning as an imaging lens to provide substantially at said associated objective lens an image of said beam at said steering axis; and a deflection mirror tower having a plurality of deflection mirrors optically disposed in the paths between said beam steering element and said lens/mirror sets, said plurality of deflection mirrors having various angular orientations to deflect said optical beam to an associated one of said imaging lens.

3. The optical beam distribution system of claim 2 wherein said plurality of mirrors of said deflection mirror tower are positioned such that the paths from said beam steering element and to said imaging lenses are of substantially equal length.

4. The optical beam distribution system of claim 3 further comprising a collimation-correction lens optically disposed in the path of said beam between said optics unit and said steering element, said collimation-correction lens operating to converge said optical beam at said imaging lens, whereby said imaging lens collimates said optical beam.

5. The optical beam distribution system of claim 4 wherein said objective lens are supported by a plurality of carriage arms of a carriage assembly, said carriage assembly further comprising a coarse actuator for moving said objective lenses across said disk surfaces.

6. The optical beam distribution system of claim 5 wherein said coarse actuator is a linear coarse actuator.

7. An arrangement for directing an optical beam onto a selected track of one of a plurality of disk surfaces of an optical storage device, said storage device having an optical beam distribution system including a plurality of imaging lenses, each being optically disposed in the path of said beam between a beam steering element and an associated one of a plurality of objective lenses, each of said objective lenses being further associated with one of said disk surfaces, said arrangement comprising:

means for generating said optical beam;

means, configured to rotate about a steering axis, for directing said optical beam to a selected objective lens at varying angles relative to an optical axis of said selected objective lens;

means for providing substantially at said selected objective lens an image of said beam at said steering axis; and means for converging said optical beam passing through said objective lens to a spot on said associated disk surface, thereby directing said optical beam to said selected track.

8. The arrangement of claim 7 further comprising means for converging said optical beam at said imaging lens such that said imaging lens collimates said optical beam.

9. The arrangement of claim 8 further comprising means for moving said objective lenses across said disk surfaces.

10. A method for controlling the direction an optical beam onto a selected track of one of a plurality of disk surfaces of an optical storage device, said storage device including an optical beam distribution system having a plurality of imaging lenses, each of said imaging lenses being optically disposed in the path of said beam between a beam steering element configured to rotate about a steering axis and an associated one of a plurality of objective lenses, each of said objective lenses being further associated with one of said disk surfaces, said method comprising the steps of:

generating said optical beam;

directing said optical beam to a selected objective lens at varying angles relative to an optical axis of said selected objective lens;

providing substantially at said selected objective lens an image of said beam at said steering axis; and converging said optical beam passing through said objective lens to a spot on said associated disk surface, thereby controlling the direction of said optical beam to said selected track.

11. The method of claim 10 further comprising the step of converging said optical beam at said imaging lens such that said imaging lens collimates said optical beam.

12. The method of claim 11 further comprising moving said objective lenses across said disk surfaces.

* * * * *